United States Patent
Esposito et al.

[11] Patent Number: 5,951,097
[45] Date of Patent: *Sep. 14, 1999

[54] IMPACT REINFORCEMENT FOR CURVED RAILS IN MOTOR VEHICLES

[75] Inventors: Scott A. Esposito, Rochester Hills; Allen Stephens, Clarkston, both of Mich.

[73] Assignee: Chrysler Corporation, Auburn Hills, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/842,855

[22] Filed: Apr. 17, 1997

[51] Int. Cl.$^6$ .......................................................... B60J 7/00
[52] U.S. Cl. ........................ 296/188; 296/189; 296/204; 296/205
[58] Field of Search ................................... 296/188, 189, 296/204, 205; 280/784

[56] References Cited

U.S. PATENT DOCUMENTS

| | | |
|---|---|---|
| 3,054,636 | 9/1962 | Wessells, III . |
| 3,746,387 | 7/1973 | Schwenk . |
| 3,827,712 | 8/1974 | Suzuki . |
| 4,133,549 | 1/1979 | Reidelbach et al. ..................... 280/784 |
| 4,194,763 | 3/1980 | Reidelbach et al. ..................... 280/784 |
| 4,428,599 | 1/1984 | Jahnle ..................................... 296/189 |
| 4,557,519 | 12/1985 | Matsuura . |
| 4,679,820 | 7/1987 | Srock et al. . |
| 4,708,391 | 11/1987 | Nakano . |
| 4,781,398 | 11/1988 | Uebelstadt et al. . |
| 4,883,309 | 11/1989 | Miyazaki et al. .......................... 296/30 |
| 4,909,565 | 3/1990 | Harasaki et al. ........................ 296/189 |
| 5,048,888 | 9/1991 | Willy et al. . |
| 5,125,715 | 6/1992 | Kijima ..................................... 296/189 |
| 5,174,628 | 12/1992 | Hayatsugu et al. . |
| 5,184,868 | 2/1993 | Nishiyama . |
| 5,364,128 | 11/1994 | Ide . |
| 5,370,438 | 12/1994 | Mori et al. ............................... 296/204 |
| 5,381,871 | 1/1995 | Ohta . |
| 5,472,063 | 12/1995 | Watanabe et al. . |
| 5,653,495 | 8/1997 | Bovellan et al. ........................ 296/204 |
| 5,743,590 | 4/1998 | Baumann ................................. 296/204 |

FOREIGN PATENT DOCUMENTS

| | | | |
|---|---|---|---|
| 2 305 335 | 10/1976 | France .................................... 296/188 |
| 0141971 | 8/1983 | Japan ..................................... 296/188 |
| 443175 | 2/1992 | Japan . |

*Primary Examiner*—Joseph D. Pape
*Assistant Examiner*—Kiran Patel
*Attorney, Agent, or Firm*—Roland A. Fuller, III

[57] ABSTRACT

An impact reinforcement for a curved rail in a motor vehicle includes a base portion extending longitudinally for attachment to a curved portion of a curved rail, and a flange portion connected to the base portion and extending longitudinally into a straight portion of the curved rail.

14 Claims, 2 Drawing Sheets

IMPACT REINFORCEMENT FOR CURVED RAILS IN MOTOR VEHICLES

BACKGROUND OF THE INVENTION

1. Field of the Invention

The present invention relates to rails for motor vehicles and, more particularly, to an impact reinforcement for curved rails in motor vehicles.

2. Description of the Related Art

Motor vehicles typically include one or more impact energy absorbing members to absorb energy of an impact. In the motor vehicle, the impact energy absorbing members are usually longitudinal rails of the motor vehicle. For a frontal impact on the motor vehicle, longitudinal front rails act as main impact energy absorbing members. The front rails are closed section rails which generally stop at a dash or instrument panel and taper to sills and underbody rail extensions through a member referred to as a "torque box".

As these motor vehicles become smaller and move toward a more "cab forward" design, the length of available crush space for a frontal impact decreases. The result is less crush space to absorb the same amount of energy. At the same time, the impact requirements governed by law are moving toward higher speed protection as well as partial or offset barrier impacts, both of which substantially increase the amount of energy the motor vehicle must absorb. As a result, the front rails must be designed to absorb more energy during a frontal impact.

The front rails typically extend from the dash panel/sill area straight to or into a bumper of the motor vehicle. A straight section which is designed to crush axially is the most efficient method of energy absorption. Unfortunately, straight front rails are not always possible due to several factors, the major of which is engine and transmission packaging. Under these circumstances, the only alternative is to curve the front rails up and over interfering engine and transmission points.

One disadvantage of curved front rails is that the geometry results in a bending mode of the front rails rather than a preferred axial crush mode. Thus, there is a need in the art to increase the bending strength of curved front rails to allow crush in an axial mode before a bending mode.

SUMMARY OF THE INVENTION

It is, therefore, one object of the present invention to provide an impact reinforcement for curved rails in a motor vehicle.

It is another object of the present invention to provide an impact reinforcement for curved front rails in a motor vehicle.

It is yet another object of the present invention to provide a "truss" type impact reinforcement to force a straight portion of a front rail to crush in an axial mode before a curved portion of the front rail buckles in a bending mode.

To achieve the foregoing objects, the present invention is an impact reinforcement for curved rails in a motor vehicle. The impact reinforcement includes a base portion extending longitudinally for attachment to a curved portion of a curved rail and a flange portion connected to the base portion and extending longitudinally into a straight portion of the curved rail.

One advantage of the present invention is that an impact reinforcement is provided for curved rails in a motor vehicle. Another advantage of the present invention is that an impact reinforcement is provided for a curved portion of a front rail in a motor vehicle. Yet another advantage of the present invention is that the impact reinforcement stabilizes the bending moment, allowing the front rail to crush in the desired axial mode. Still another advantage of the present invention is that the impact reinforcement is efficient in design and is relatively less in weight.

Other objects, features and advantages of the present invention will be readily appreciated as the same becomes better understood after reading the subsequent description when considered in connection with the accompanying drawings.

DESCRIPTION OF THE PREFERRED EMBODIMENT(S)

Figure 1:
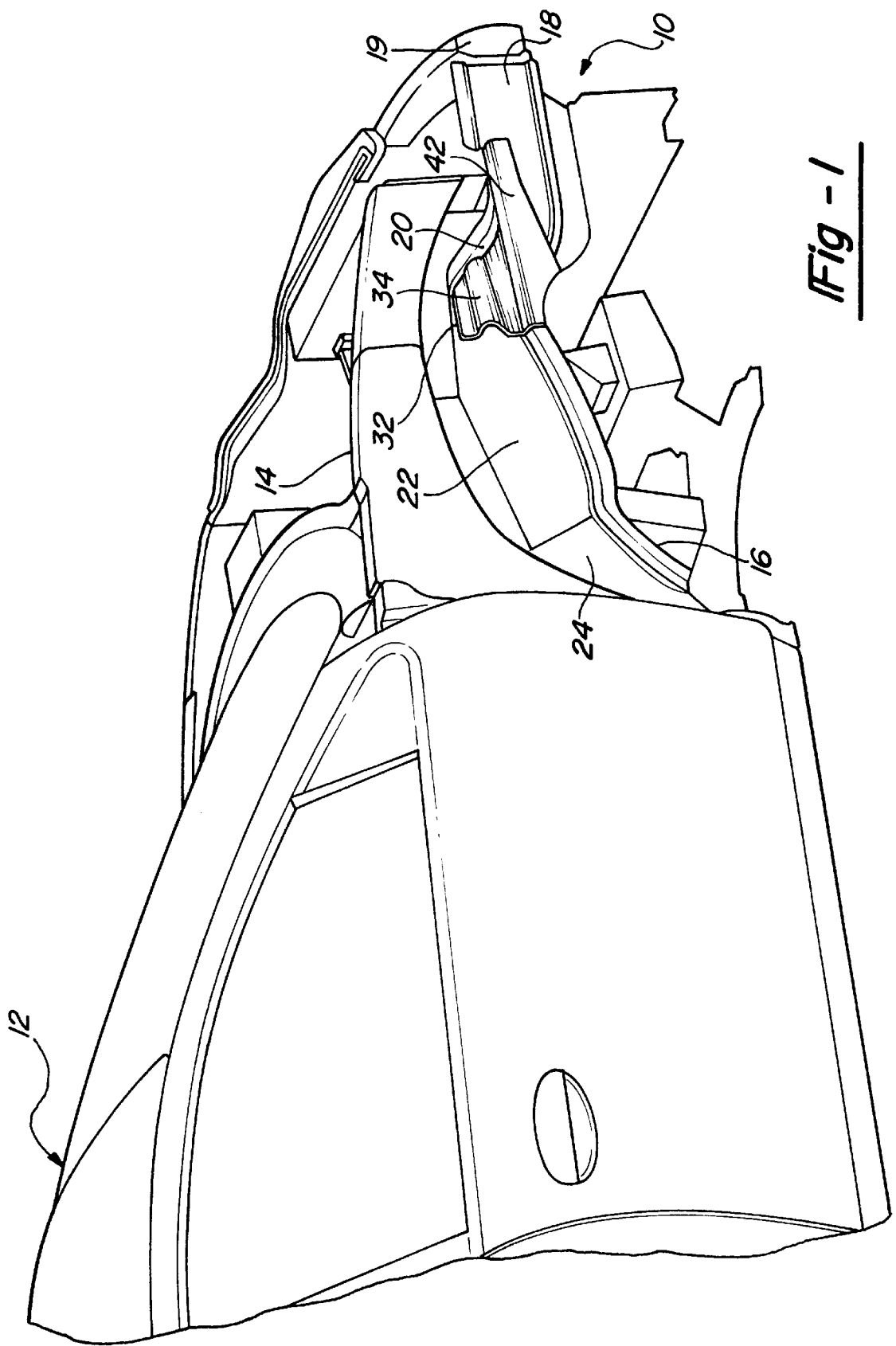
FIG. 1 is a perspective view of an impact reinforcement, according to the present invention, illustrated in operational relationship with a curved front rail in a motor vehicle.

Referring to FIG. 1, an impact reinforcement 10, according to the present invention, is illustrated in operational relationship with a motor vehicle, generally indicated at 12. The motor vehicle 12 includes a vehicle body 14 having a portion mounted upon a pair of longitudinal front rails 16, only one of which is shown. The front rail 16 has a generally straight tip portion 18 adjacent a bumper 19, a first bend or curved portion 20 extending generally upwardly and longitudinally from the tip portion 18, a generally straight upper portion 22 extending from the first curved portion 20, and a second bend or curved portion 24 extending generally downwardly and longitudinally from the upper portion 22. The front rail 16 also includes a generally straight body portion (not shown) extending longitudinally from the second curved portion 24. It should be appreciated that the portions 20, 22 and 24 form a "curved" portion of the front rail 16 and the portion 18 forms a "straight" portion of the front rail 16.

Figure 4:
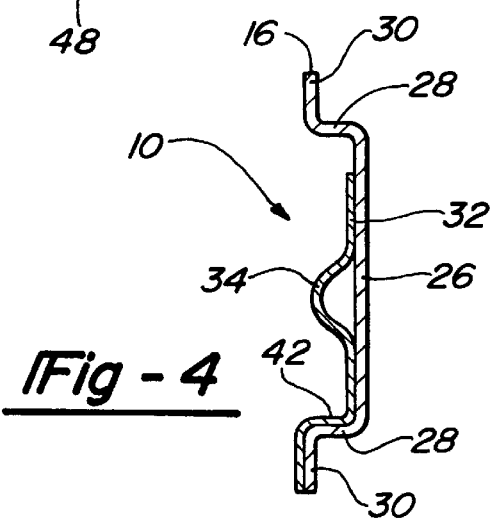
FIG. 4 is a sectional view taken along line 4—4 of FIG. 2.

As illustrated in FIG. 4, the front rail 16 includes a generally planar and vertical base wall 26 and a generally planar side wall 28 extending substantially perpendicular to the base wall 26 at an upper and lower end thereof. The front rail 16 also includes a generally planar flange 30 extending substantially perpendicular from an end of each of the side walls 28. The base wall 26, side walls 28 and flanges 30 are integral, unitary and formed as one piece. The front rail 16 is made of a rigid material such as a metal material.

Figure 2:
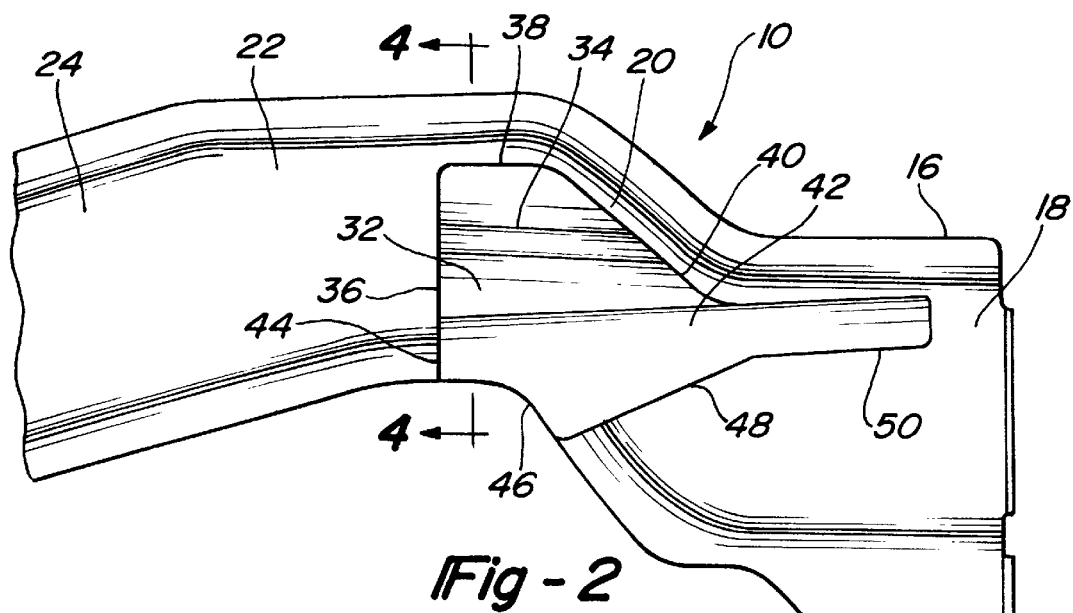
FIG. 2 is a elevational view of the impact reinforcement and curved front rail of FIG. 1.
Figure 3:
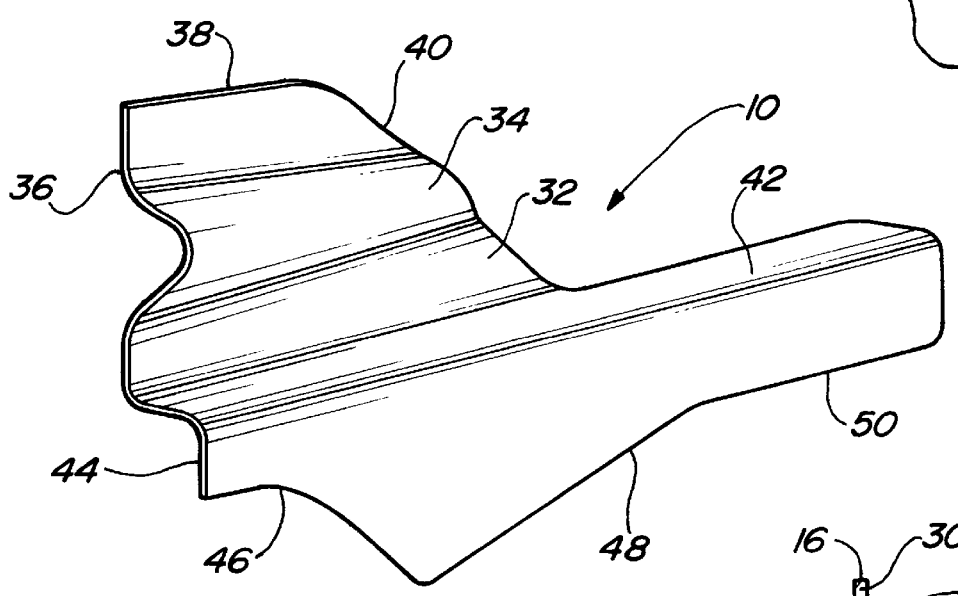
FIG. 3 is a perspective view of the impact reinforcement of FIG. 1.

Referring to FIGS. 2 through 4, the impact reinforcement 10 includes a base portion 32 extending longitudinally. The base portion 32 is generally planar and has a raised section or rib 34 extending longitudinally. The rib 34 is generally arcuate in cross-sectional shape and extends transversely to the base portion 32. The base portion 32 also has a generally vertical rear edge 36, a generally straight upper edge 38 and a generally inclined or curved forward edge 40 complementary to the incline or curve of the first curved portion 20 of the front rail 16.

The impact reinforcement 10 also includes a flange portion 42 connected to the base portion 32 and extending longitudinally. The flange portion 42 has a generally inverted "L" cross-sectional shape complimentary to the side wall 28 and flange 30 and extends longitudinally a distance greater than the base portion 32. The flange portion 42 has a generally vertical rear edge 44, a generally curved or arcuate edge 46 complimentary to the curve of the first curved portion 20 of the front rail 16, a generally inclined edge 48 and a generally straight edge 50 forming a bottom edge of the flange portion 42. The impact reinforcement 10 is made of a rigid material such as a metal material. The base portion 32 and flange portion 42 are integral, unitary and formed as one piece. It should be appreciated that the impact reinforcement 10 forms a truss spanning section that spans the first curved portion 20 and tip portion 18.

To assemble, the impact reinforcement 10 is secured to the front rail 16 by suitable means such as welding. The impact reinforcement 10 is located relative to the front rail 16 such that the arcuate edge 46 is complementary to the curvature of the flange 30 of the first curved portion 20 and the flange portion 42 abuts or contacts the lower side wall 28 and flange 30 and a portion of the flange portion 42 extends longitudinally into the tip portion 18 of the front rail 16. Also, the base portion 32 abuts or contacts the base wall 26 and the front edge 40 of the base portion 32 is spaced from the upper side wall 28 and complementary to the incline of the first curved portion 20.

In the event of a frontal impact on the motor vehicle 12, the impact reinforcement 10 strengthens the first curved portion 20 such that the tip portion 18 crushes axially prior to buckling of the first curved portion 20. It should be appreciated that the impact reinforcement 10 reinforces the discontinuity in the bend of the front rail 16 and bridges the opposite compression and tension surfaces of the front rail 16 to stabilize the bending moment, allowing the tip portion 18 to crush in the desired axial mode. It should also be appreciated that, in this way, the maximum impact energy is extracted from the front rail 16 by sequentially crushing the tip portion 18, then buckling the first curved portion 20 in a bending mode.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An impact reinforcement for a curved front rail in a motor vehicle, the front rail having a generally planar and vertical base wall and a generally planar side wall extending substantially perpendicular to the base wall at a lower end thereof and a generally planar flange extending substantially perpendicular from the side wall, said impact reinforcement comprising:

a base portion extending longitudinally for attachment to the base wall of a curved portion of the curved front rail, said base portion having a rear edge, an upper edge and a curved forward edge shaped complementary to the curved portion of the curved rail; and a flange portion connected to said base portion and for extending longitudinally alongside a straight portion of the curved front rail for attachment to the side wall and flange of the curved front rail, said flange portion extending longitudinally a distance greater than said base portion and having a rear edge and a bottom edge with an arcuate portion shaped complementary to the flange of the curved portion of the curved front rail.

2. An impact reinforcement as set forth in claim 1 wherein said base portion is generally planar.

3. An impact reinforcement as set forth in claim 2 wherein said base portion includes a rib extending transversely.

4. An impact reinforcement as set forth in claim 3 wherein said rib is arcuate in cross-sectional shape.

5. An impact reinforcement as set forth in claim 1 wherein said flange portion has an inverted L cross-sectional shape.

6. An impact reinforcement as set forth in claim 1 wherein said flange portion has said bottom edge having said arcuate portion, an inclined portion extending from said arcuate portion and a straight portion extending from said inclined portion.

7. An impact reinforcement as set forth in claim 1 wherein said base portion and said flange portion are integral, unitary and formed as one-piece.

8. An impact reinforcement and rail assembly for a motor vehicle comprising:

a curved front rail having a curved portion and a straight portion extending longitudinally from said curved portion, said curved front rail having a generally planar and vertical base wall and a generally planar side wall extending substantially perpendicular to said base wall at a lower end thereof and a generally planar flange extending substantially perpendicular from said side wall; and an impact reinforcement having a base portion extending longitudinally and attached to said base wall of said curved portion and a flange portion connected to said base portion and extending longitudinally alongside said straight portion of said curved front rail and attached to said side wall and said flange, said base portion having a rear edge, an upper edge and a curved forward edge shaped complementary to said curved portion of said curved front rail, said flange portion extending longitudinally a distance greater than said base portion and having a rear edge and a bottom edge with an arcuate portion shaped complementary to said flange of said curved portion of said curved front rail.

9. An impact reinforcement and rail assembly as set forth in claim 8 wherein said base portion is generally planar.

10. An impact reinforcement and rail assembly as set forth in claim 9 wherein said base portion includes a rib extending transversely.

11. An impact reinforcement and rail assembly as set forth in claim 10 wherein said rib is arcuate in cross-sectional shape.

12. An impact reinforcement and rail assembly as set forth in claim 8 wherein said flange portion has an inverted L cross-sectional edge.

13. An impact reinforcement and rail assembly as set forth in claim 8 wherein said flange portion has said bottom edge having said arcuate portion, an inclined portion extending from said arcuate portion and a straight portion extending from said inclined portion.

14. An impact reinforcement as set forth in claim 8 wherein said base portion and said flange portion are integral, unitary and formed as one-piece.

* * * * *